No. 676,851. Patented June 18, 1901.
W. H. SAUVAGE.
AIR BRAKE MECHANISM.
(Application filed Sept. 28, 1900.)
(No Model.)
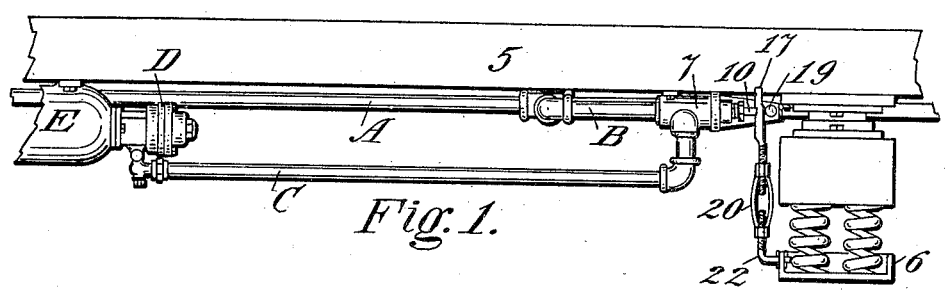
Fig. 1.
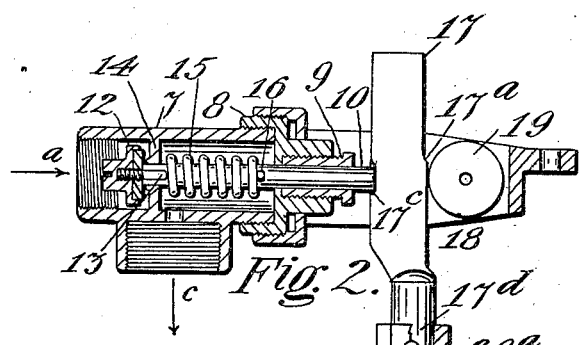
Fig. 2.
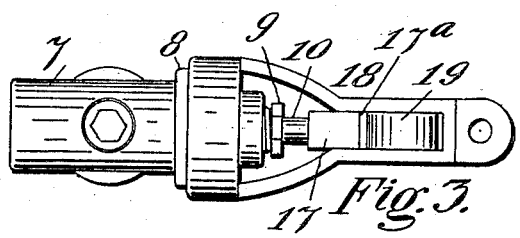
Fig. 3.
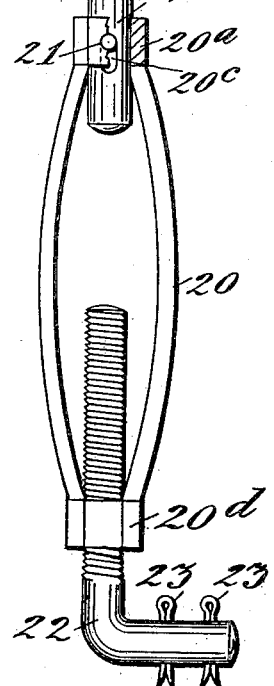
WITNESSES:
H. M. Neff
Dora C. Shick
INVENTOR.
W<sup>m</sup> H. Sauvage,
BY
ATTORNEY.
THE NORRIS PETERS CO., PHOTO-LITHO., WASHINGTON, D. C.

UNITED STATES PATENT OFFICE.

WILLIAM H. SAUVAGE, OF DENVER, COLORADO, ASSIGNOR TO THE SAUVAGE DUPLEX AIR BRAKE COMPANY, OF SAME PLACE.

AIR-BRAKE MECHANISM.

SPECIFICATION forming part of Letters Patent No. 676,851, dated June 18, 1901.

Application filed September 28, 1900. Serial No. 31,361. (No model.)

*To all whom it may concern:*

Be it known that I, WILLIAM H. SAUVAGE, a citizen of the United States of America, residing at Denver, in the county of Arapahoe and State of Colorado, have invented certain new and useful Improvements in Air-Brake Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in air-brake mechanism wherein an additional set of devices comprising a triple valve, an auxiliary reservoir, and a brake-cylinder are arranged to be brought into requisition by a depression of the spring-supported car-body incident to the weight of the load in order that the braking force may be proportionate to the aggregate gravity of the car and its load. In constructions of this class a valve connected with the train-brake pipe and the branch pipe leading to the triple valve of the extra set of brake appliances must be employed. This valve is arranged to be opened by the downward movement of the car-body incident to the weight of the load and closed by the upward movement of the car incident to the removal of the load. When this valve is once open, it is desirable that it remain open as long as the car is loaded. It sometimes happens, however, that the car-body is depressed by the load to such a degree that the natural vibration incident to travel will cause it under ordinary circumstances to move alternately above and below the plane required to hold the valve open. For instance, when the car is not in motion the car-body may be depressed to such a degree that it will not quite open the valve; but as soon as the car is put in motion the vibration will cause it to move sufficiently below its normal plane to open the valve occasionally. By reason of this opening of the valve at intervals the auxiliary reservoir of the extra set of brake devices will become charged with air and the reduction of pressure in the train-pipe will set the brakes. When, however, the engineer desires to release the brakes, it may happen that the valve is closed and the air cut off from the branch pipe leading to the triple valve of the extra set of brake devices. In this case it is evident that the brakes cannot be released in the ordinary way.

Hence the object of my present invention is to avoid the vibratory movement of the valve, and to this end provision is made for locking the valve open during the vibration of the loaded car-body within certain predetermined limits. In other words, by virtue of my improvement when the valve is once opened it remains open as long as needed or until the load has been removed from the car.

The invention will now be described in detail, reference being made to the accompanying drawings, in which is illustrated an embodiment thereof.

In the drawings, Figure 1 is a fragmentary side elevation of a car equipped with my improvements. Fig. 2 is a section taken through the valve mechanism, the parts being shown on a larger scale. Fig. 3 is a top or plan view of the same.

The same reference characters indicate the same parts in all the views.

Let the numeral 5 designate the car-body and 6 the sand-board or relatively stationary part above which the car-body vibrates. Suitably mounted on and arranged to vibrate with the car-body is a casing 7, provided with a cap 8, secured thereon and having a stuffing-box 9, through which passes a stem 10, connected with the valve 12. This valve-stem passes through an opening formed in a partition 14, provided with a valve-seat. The valve-stem is provided with one or more grooves, which extend from the valve a sufficient distance to allow the air to pass freely from the one compartment of the valve-casing to the other when the valve is moved away from its seat. On the opposite side of the partition 14 from that on which the valve is located the valve-stem is surrounded by a coil-spring 15, one extremity of which bears against the partition, while the opposite extremity engages a stop 16 on the stem. The tendency of this spring is to hold the valve closed or against its seat on the partition 14.

The opposite extremity of the valve-stem protrudes through the stuffing-box 9 to engagement with a rod 17, which passes through a yoke 18, screwed upon the cap 8 of the valve-casing, which is exteriorly threaded for the purpose. Upon this yoke is mounted an antifrictional roller 19, adapted to engage the rod 17 on the side opposite that engaged by the valve-stem extremity. The rod 17 is provided with an offset 17$^a$, located about midway of its length. Above this offset the width of the rod is somewhat reduced. This rod is so adjusted that when the car is empty the yoke-roller and valve-stem engage the reduced portion of the rod above the offset, and in this case the valve 12 is closed through the action of the spring 15. As soon, however, as the car is loaded the valve-casing and yoke are depressed with the car-body to bring the valve and roller into a plane below the offset 17$^a$, whereby the valve-stem is actuated to open the valve, allowing the air to pass from the train-brake pipe A into the valve-casing, as indicated by arrow $a$, (see Fig. 2,) and thence through the ports 13 of the valve-stem and out of the casing, as indicated by the arrow $c$, (see Fig. 2,) into a pipe C, and thence to the triple valve D of the auxiliary reservoir E.

Just below the plane of the offset 17$^a$ the rod 17 is provided with a recess 17$^c$ on the opposite side from the offset. The valve-stem extremity engages this recess when the casing and yoke are in the proper position to open the valve by reason of the engagement of the rod 17 with the valve-stem. The lower extremity 17$^d$ of the rod 17 is connected with a collar 20$^a$ of a turnbuckle 20 by a pin 21, fast on the collar and passing through a slot 20$^c$ formed in the rod, whereby the rod is allowed a limited vertical movement in the turnbuckle with the valve-casing and yoke. Hence when the valve-stem engages the recess 17$^c$ the tension of the spring 15 locks the rod to the valve-stem temporarily and causes the rod to move vertically with the valve-stem, casing, and car-body a distance equal to the length of the slot 20$^c$, which may be so regulated as to correspond with the range of the car-body's vertical vibration when loaded, thus maintaining the valve 12 open whenever there is sufficient load to depress it to such a position that it would normally be open only occasionally.

The lower collar 20$^d$ of the turnbuckle is threaded to receive the threaded portion of a rod 22, whose lower extremity is connected with the sand-board 6 in any suitable manner, as by cotters 23, whereby it may be readily attached for purposes of adjustment in order that the rod 17 may be set to correspond with the degree of the car-body's movement incident to any load which it may be desired to place thereon.

The valve-operating mechanism described and claimed herein is also shown, but not broadly claimed, in my application filed September 28, 1900, Serial No. 31,362.

Having thus described my invention, what I claim is—

1. In an air-brake system, the combination with the train-brake pipe and a branch pipe connected with the triple valve of the brake mechanism, of an interposed normally closed, spring-held valve connected with the two pipes, and provided with a protruding valve-stem, and a rod mounted on a relatively stationary part of the car and shaped to engage said valve-stem and open the valve when the car-body and valve have been depressed a predetermined distance.

2. The combination with the air-brake mechanism, of a normally closed, spring-held valve, through which the air must pass to the the brake mechanism, said valve being provided with a protruding stem, and a rod mounted on a relatively stationary part of the car and adapted to engage said valve-stem and open the valve when the car-body and valve have been depressed a predetermined distance.

3. The combination with air-brake mechanism, of a normally closed, spring-held valve, through which the air must pass to the brake mechanism, said valve being provided with a protruding stem, a rod mounted on a relatively stationary part of the car and adapted to engage said valve-stem and open the valve when the car-body and valve have been depressed a predetermined distance, said rod being arranged to move longitudinally within certain limits, and means for locking the rod in position to hold the valve open during the rod's longitudinal movement.

4. The combination with air-brake mechanism, of a normally closed, spring-held valve, through which the air must pass to the brake mechanism, said valve being provided with a protruding stem, a rod mounted on a relatively stationary part of the car and adapted to engage said valve-stem and open the valve when the car-body and valve have been depressed a predetermined distance, said rod being arranged to move longitudinally within certain limits, the rod being provided with a recess which the valve-stem extremity enters when the valve is opened, whereby the valve-stem and rod are locked together during the longitudinal movement of the latter.

5. The combination with air-brake mechanism, and a normally closed, spring-held valve, through which the air must pass to said mechanism, said valve being provided with a protruding stem, of a yoke connected with the valve-casing and into which the valve-stem extremity protrudes, a bearing mounted on the yoke opposite the valve-stem extremity, and a rod mounted on a relatively stationary part of the car and arranged to pass through the yoke between the said bearing and the valve-stem, the said rod being constructed to act on the valve-stem and open the valve, when the valve-casing and yoke have been depressed a predetermined distance.

6. The combination with air-brake mechanism, and a normally closed spring-held valve through which the air must pass to said mechanism, said valve being provided with a protruding stem, of a yoke connected with the valve-casing and into which the valve-stem extremity protrudes, a bearing mounted on the yoke opposite the valve-stem extremity, and a rod mounted on a relatively stationary part of the car and arranged to pass through the yoke between the said bearing and the valve-stem, the said rod being provided with an offset whereby as the yoke-bearing engages and passes the offset, the stem is actuated sufficiently to open the valve.

7. The combination with valve mechanism mounted on a vertically-movable part and provided with a protruding stem, of a yoke attached to the valve-casing and provided with an antifrictional bearing located opposite the valve-stem extremity, a rod mounted on a relatively stationary part, and permitted a limited vertical movement, said rod passing through the yoke between the valve-stem extremity and the antifrictional bearing, the said rod having a recess on one side adapted to receive the valve-stem, and an offset on the opposite side adapted to engage the bearing and open the valve.

8. The combination with valve mechanism mounted on a vertically-movable part and provided with a protruding stem, of a yoke attached to the valve-casing and provided with a bearing located opposite the valve-stem extremity, a rod having a turnbuckle connection with a relatively stationary part, the rod being connected with the turnbuckle by a pin fast in one part and passing through a slot formed in the other part, said rod passing through the yoke between the valve-stem extremity and the yoke-bearing, the rod being constructed to open the valve and interlock with the valve-stem simultaneously.

9. The combination with valve mechanism mounted on a vibrating part, and having a protruding valve-stem, a yoke attached to the valve-casing and provided with a bearing opposite the valve-stem extremity, and a rod mounted on a relatively stationary part and arranged to pass between the valve-stem extremity and the yoke-bearing, said rod being constructed to act on the valve-stem and operate the valve when the valve mechanism has moved a predetermined distance.

In testimony whereof I affix my signature in presence of two witnesses.

WILLIAM H. SAUVAGE.

Witnesses:
A. J. O'BRIEN,
MARY C. LAMB.